Figures 1, 2:
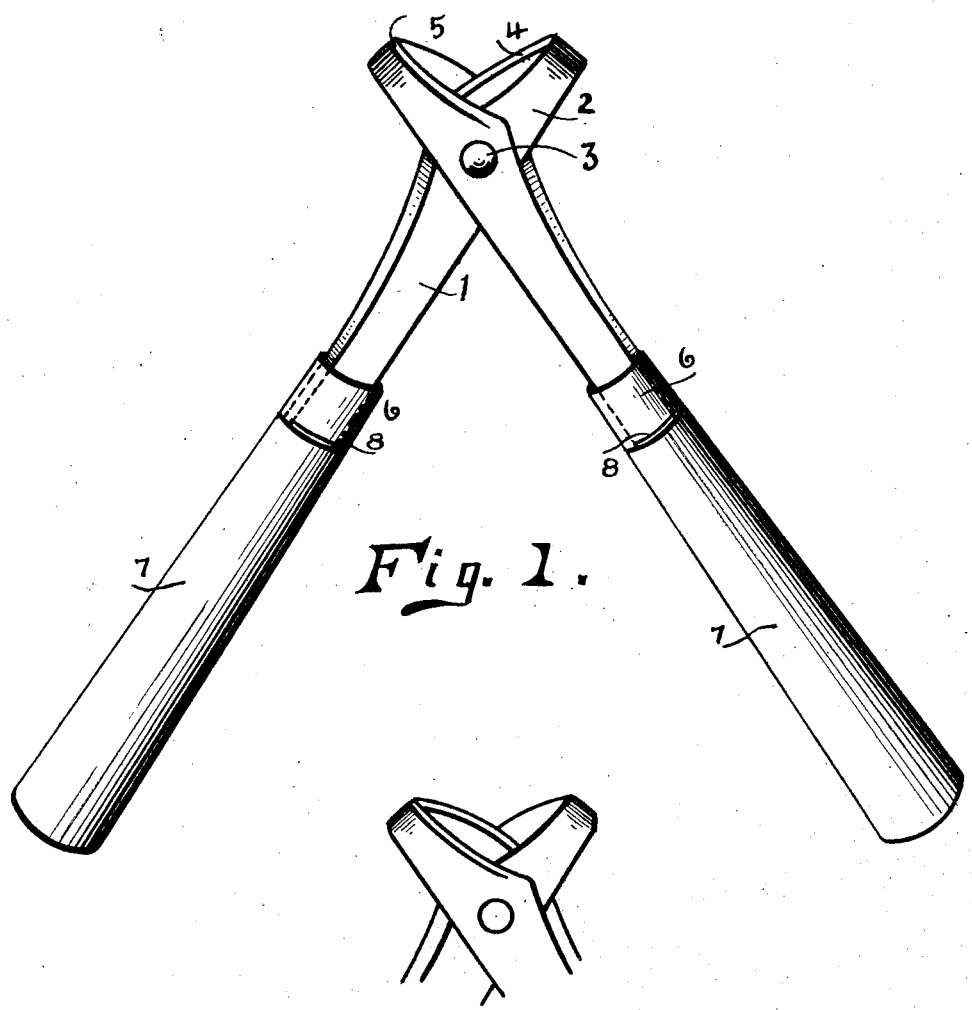

Oct. 9, 1928.

E. ANDERSON

DEHORNER

Filed Jan. 25, 1926

1,686,723

INVENTOR.
Edward Anderson

Patented Oct. 9, 1928.

1,686,723

UNITED STATES PATENT OFFICE.

EDWARD ANDERSON, OF DENVER, COLORADO.

DEHORNER.

Application filed January 25, 1926. Serial No. 83,764.

My invention relates to improvements in calf-dehorners in which two cutting blades of flat steel are curved into two long open-ended loops, being riveted together at the widest opening of the loop which is near the closed and cutting end, the long members of each loop terminating in a ferrule and handle. The blades may be riveted together in two ways: first as in Fig. 1 where both members of one loop are inside the members of the other loop; or second, as in Fig. 2 where the members of each loop alternate inside and outside of the other, but in either method the result is essentially the same.

As shown in both Figs. 1 and 2, the width of the steel is ground narrower at the apex of the hyperbolic curves between the rivets of each member knife which forms a diamond like opening between the two, with the result when being closed they cut with a shearing action with little or no crushing, and cup out center of the horn and the hyperbola curves proportion this cupping to the size of the horn.

Two forms of the invention are illustrated in the accompanying drawing. Referring to Fig. 1 which is a view of the complete dehorner, the metal loop 1, the blade 2 attached to the opposite blade by the rivets 3, sharpened on the inner edge 4, and on the outside edge of opposite loop 5, which form the bearing and the cutting edges of the dehorner. The open ends of the steel loops pass through the ferrule 6 and make a right angle turn at their base 8 held firmly in place by the wooden handles 7, all substantially as set forth.

I am aware that prior to my invention dehorners have been made that cup the horn, and I therefore do not claim this feature broadly; but

I claim:

A dehorning implement comprising two loop members pivotally connected together in crossed relation at each side of the widest portion of the loops, said loop-members on one side of the pivot being substantially the form of hyperbolic curves forming cutting blades, said cutting blades gradually decreasing in width from the pivot points to the apex of the hyperbolic curve so as to give an angular shearing cut, and handles attached to the opposite ends of the loop members.

EDWARD ANDERSON.